United States Patent [19]
Isbell

[11] Patent Number: 5,770,062
[45] Date of Patent: Jun. 23, 1998

[54] DEVICE FOR AIDING THE SOLUBILIZATION OF GASES IN LIQUIDS

[75] Inventor: Arthur F. Isbell, Bryan, Tex.

[73] Assignee: Wildlife Science, Inc., Bryan, Tex.

[21] Appl. No.: 744,573

[22] Filed: Nov. 6, 1996

Related U.S. Application Data

[63] Continuation-in-part of Ser. No. 315,086, Sep. 29, 1994, abandoned, which is a continuation-in-part of Ser. No. 56,859, May 3, 1993, abandoned.

[51] Int. Cl.$^6$ ................................ C02F 1/74; C02F 1/78; B01F 3/04
[52] U.S. Cl. ..................... 210/220; 210/221.2; 261/91; 261/93
[58] Field of Search ...................... 210/620, 242.2, 210/221.2, 220, 760; 261/91, 93

[56] References Cited

U.S. PATENT DOCUMENTS

| | | | |
|---|---|---|---|
| Re. 29,782 | 9/1978 | McWhirter | 210/220 |
| 1,374,499 | 4/1921 | Greenawalt | 261/93 |
| 1,374,500 | 4/1921 | Greenawalt | 261/93 |
| 1,526,596 | 2/1925 | Greenawalt | 261/91 |
| 2,055,665 | 9/1936 | Booth | 261/93 |
| 2,183,071 | 12/1939 | Guthrie et al. | 261/93 |
| 2,271,709 | 2/1942 | Norris | 261/91 |
| 2,783,088 | 2/1957 | Butler | 299/63 |
| 2,962,835 | 12/1960 | Clark | 261/91 |
| 3,053,390 | 9/1962 | Wood | 261/93 |
| 3,497,185 | 2/1970 | Dively | 210/242.2 |
| 3,516,545 | 6/1970 | Larkin | 210/195 |
| 3,560,379 | 2/1971 | Muskat | 210/242.2 |
| 3,576,316 | 4/1971 | Kaelin | 261/91 |
| 3,591,492 | 7/1971 | Neuspiel | 210/220 |
| 3,660,277 | 5/1972 | McWhirter et al. | 210/192 |
| 3,709,420 | 1/1973 | Auler et al. | 261/91 |
| 3,709,470 | 1/1973 | Auler et al. | 261/91 |
| 3,814,396 | 6/1974 | DiGregorio et al. | 261/93 |
| 4,066,722 | 1/1978 | Pietruszewski et al. | 261/87 |
| 4,582,599 | 4/1986 | Repin et al. | 210/110 |
| 5,213,718 | 5/1993 | Burgess | 261/93 |

FOREIGN PATENT DOCUMENTS

| | | |
|---|---|---|
| 0151434 | 8/1985 | European Pat. Off. . |
| 2466271 | 10/1979 | France . |

Primary Examiner—Cynthia L. Nessler
Attorney, Agent, or Firm—Vaden, Eickenroht & Thompson, L.L.P.

[57] ABSTRACT

An apparatus is disclosed for rapidly and efficiently dissolving gases in a liquid. A diffuser, having a closed top and an opened bottom, preferably in the form of a conical-shaped frustum having a plurality of openings around the perimeter near the closed top, is submerged in the liquid and rotated at relatively high speeds creating a centrifuge-pump. When the rotating diffuser is located near the surface of the liquid, no additional gas is required in the dissolution process because gas from the surface of the liquid is introduced by cavitation. When the device is submerged substantially below the surface or if a gas other than oxygen is to be dissolved, additional gas must be pumped into the bottom opening of the rotating diffuser or very near the high velocity horizontal liquid jets on the periphery of the diffuser. This device can be used in the oxygenation of treated sewage water, the removal of impurities from liquids, and the oxygenation of horticultural ponds to increase production.

25 Claims, 4 Drawing Sheets

DEVICE FOR AIDING THE SOLUBILIZATION OF GASES IN LIQUIDS

This application is a continuation-in-part of application Ser. No. 08/315,086, filed Sep. 29, 1994, now abandoned which was a continuation-in-part of application Ser. No. 08/056,859, filed May 3, 1993 now abandoned both entitled "DEVICE FOR AIDING THE SOLUBILIZATION OF GASES IN LIQUIDS."

BACKGROUND OF THE INVENTION

1. Field of the Invention

This invention pertains to the dissolution of gases in liquids and more specifically to a device for introducing large numbers of micro-bubbles of the gas into the liquid to greatly increase the gas/liquid contact, facilitating rapid dissolution.

2. Description of the Prior Art

The ability to rapidly and efficiently dissolve gases and liquids is required in several different fields in several different applications. Soluble gases are relatively easily and rapidly dissolved in liquids, especially under the application of elevated pressure. However, the less soluble the gases the more difficult it is to dissolve them in liquid economically and efficiently.

Additional difficulties are encountered when attempting to dissolve one gas of a gas mixture, such as dissolving oxygen in water from an air mixture that is approximately 20% oxygen and 80% nitrogen. It is well known that the rate of solubility of the gases in the liquid is directly proportional to the concentration of the gases in the mixture. Thus, initially the oxygen in air is dissolved at a rate that is 20% of the rate of dissolving pure oxygen. As the oxygen is dissolved, the percentage of oxygen decreases, as does the rate of dissolution. However, many times it is desirable to dissolve oxygen in a liquid and typically air is the desired source of oxygen due to the availability.

Frequently, it is desirable to dissolve oxygen in water. Oxygen, however, is relatively insoluble in water. For example, at 32° C. The solubility of oxygen in water in contact with air at one atmosphere of pressure is only 7.3 mg./liter or 7.3 parts per million (p.p.m). Solubility increases with the decrease in temperature-at 0° C. The solubility is approximately 14.6 p.p.m.

Many applications exist that require the dissolution of large amounts of oxygen into a large volume of liquid. For example, it is necessary to oxygenate commercial fish ponds to enhance production and to oxygenate treated sewage or process water from industrial plants and mills to purify the liquid.

Oxygenation of commercial fish ponds is necessary for the following reasons. For example, aquatic organisms, including both animals and plants require at least a minimum amount of dissolved oxygen in water to survive. The amount of required dissolved oxygen varies between different aquatic organisms. For example, cold water fish such as trout and salmon require much more dissolved oxygen than warm water organisms, such as catfish or crawfish. Currently, aquatic animals such as crawfish, shrimp, catfish, trout, salmon, and abalone are being raised in horticultural ponds. In order to sustain maximum production in these ponds, a minimum amount of dissolved oxygen is required. The more oxygen dissolved in the pond water, the more will be the number of animals that can be raised.

Adequate dissolved oxygen in a pond becomes critical at night and on very cloudy days when photosynthetically produced oxygen essentially stops. If the plant and animal life in the pond deplete the dissolved oxygen below a critical value, some or all the living animals and plants die quickly.

Oxygen is introduced into commercial fish ponds by a variety of mechanisms where the natural air-to-water contact is insufficient to reach the desired oxygen level. As previously stated, when water is in contact with air, the maximum concentration or saturation point of oxygen in water at 32° C. and one atmosphere of pressure is approximately 7.3 p.p.m. Typically, it is desirable to maintain the oxygen concentration in the fish pond as close to saturation point as possible to enhance production. The rate of solution increases as wind and wave action increase because of increased air-to-water contact. However, even on windy days the rate of solution is slow.

One source of oxygen in the outdoor commercial ponds is green plants. Any green plant that engages in photosynthesis utilizes some of the dissolved oxygen, but normally produces significantly more photosynthetic oxygen than it uses. However, in darkness no photosynthetic oxygen is produced, yet the plant organism is using some of the dissolved oxygen. Therefore, typically in a fish pond the dissolved oxygen decreases during the night to its lowest value at daybreak, unless there is considerable night wave action. On the other hand, many commercial fish ponds are inside, requiring photosynthesis producing light sources.

Many attempts have been made at trying to raise the oxygen content of the water in commercial fish ponds. Most techniques are targeted at improving the gas-to-water contact, including: pumping pond water over rocky waterfalls; squirting water from fountains in the air; turning paddle wheels on surface of the ponds; and pumping water/ air mixtures at very high pressures and velocities into the pond surfaces at various angles. All of these techniques require large amounts of energy primarily because of the large amount of energy required to lift 8.3 lb./gallon of water above the pond surface.

Examples of these types of aeration devices are shown in U.S. Pat. Nos. 3,576,316 ("Kaelin") and 2,783,088 ("Butler"). Both of the disclosed devices are premised on the fact that as liquid in a reservoir is pumped above the surface it takes up air before it returns to the reservoir. Large amounts of energy are required to pump the liquid above the surface.

An alternate means of introducing more oxygen into the water is the use of a simple stack of wire screens placed in the water with the screen mesh fines decreasing from bottom to top. A stream of air is then pumped into the water below the screen stack. This technique requires little energy, but the bubbles coming through the screens are still relatively large and at shallow depths, the efficiency is very poor.

Another oxygen introducing means is the use of spinning air nozzles beneath the water. The nozzles are somewhat more efficient than the other schemes because they are capable of producing small bubbles. However, the devices are unsymmetrical and require considerable energy to spin. Venturi tubes and porous diffuser stones are also used, but are not efficient, particularly at shallow depths.

U.S. Pat. No. 3,709,470 ("Auler") discloses a floating surface aerator, which includes a complex floating structure for suspending rotating blades or shovels. The rotation of the blades is intended to act as a centrifugal aerator to cause liquid to flow outwardly at the surface. The complexity of the structure makes this device large and expensive. Also, a great deal of energy is required to rotate the blades and to a significant degree, it also pumps liquid above the surface.

Oxygen is also used in water treatment applications. Oxygen dissolved in water is required in very large quantities for water purification applications. Sewage treatment plants use much oxygen to bring about bacterial decomposition of contaminating organic matter. After this step, government regulations require that the effluent contain 5–6 p.p.m. of dissolved oxygen to protect the living organisms in lakes and streams into which the effluent is dumped. Due to this stringent requirement 50–90% of the energy consumed in such plants is required simply to pump air. This air is pumped under pressure through many ceramic diffusers at 8 foot depths in typical sewage treatment plants and it is common knowledge that less than 25% of the added oxygen dissolves by the time the greater than micro size bubbles leave the water surface. This device as well as other devices used in the sewage treatment plants are very inefficient, very costly, and require a great deal of power to run.

Oxygen can also be used to clean process water from industrial plants, such as chemical plants, paper mills, and many other similar operations. However, again the dissolution process is very costly.

Just as oxygen is used to remove undesirable products in water, so too is ozone. Ozone is a form of oxygen having three oxygen atoms per molecule rather than two. Ozone is a much better oxidizing agent than oxygen because ozone is a much more energetic molecule. The ozone is used for oxidatively destroying organic compounds in the liquid. Organic destruction using ozone requires only seconds to minutes, as opposed to the hours to days required to destroy the organic compound using oxygen. An aqueous solution of ozone decomposes within about 25 minutes at 77° F. (25° C.), leaving no undesirable product. Ozone is very fast acting at very low concentration which makes it invaluable for removing undesirable bacteria, viruses, and contaminating organic matter from drinking water, spas, swimming pool water, and industrial water. However, there are very few efficient means for producing ozone.

The problems of producing ozone from oxygen and the inefficient methods currently available for dissolving it make the ozone purification of water more expensive than chlorine treatment. Even so, it is now being recognized as superior because any excess ozone decomposes within about 25 minutes at 77° F. (25° C.), leaving no bad taste, bad odor or toxic products, as is true for chlorine. Chlorine does not destroy organic contaminants but does react with them to produce substances that are now recognized as carcinogens. In spite of the current greater cost of the ozone purification of water, the drinking water in at least one major United States city is purified with ozone, as is virtually all the drinking water in Europe. The water in virtually all European swimming pools and spas and increasing number of pools and spas in the United States is purified with ozone. Yet, the available methods for dissolving ozone in a liquid are relatively inefficient.

The dissolution of gases in liquids is required in other areas as well. A gas-to-liquid reaction can be used in any chemical process which requires the dissolution of a slightly soluble gas. For example, cleaning and disinfecting agents, like bleach and related products, are produced by dissolving the slightly soluble chlorine gas in a water slurry of lime. Carbon monoxide is a valuable gas for reacting with many organic liquids for producing products of great value such as different types of polymers and pharmaceutical.

U.S. Pat. No. 1,526,696 ("Greenwalt") discloses a rotary atomizer having several curved vane discharge passages that are terminated at approximately right angles and adapted to discharge liquid and gas from the interior of the atomizer into the surrounding liquid. It is intended that a gas be drawn into the device as it is rotated or that it be pumped in to the device from an external source. The curved vane discharge passages make the manufacturing of the device difficult. Also, a great deal of energy is required to run the device, because of the resistance caused by the jagged periphery and the excessive drag produced by the curved vane discharge passages. In addition, the structure will not cause a significant pumping action for the gas.

U.S. Pat. No. 2,183,071 ("Guthrie") is designed to remove impurities from a fluid by an extraction process and not to dissolve a gaseous substance in a liquid phase. Some dissolution occurs, however, but very inefficiently. Guthrie teaches the use of a rotating bell for combining two different types of fluids by drawing one liquid (internal phase) from a stationary source out small holes in the bell to combine with another liquid (external phase). Guthrie specifically teaches that it is undesirable to allow the external phase liquid to mix with the internal phase, because it would result in a useless pumping of liquid that wastes power because of the undesirable swirling of the body of liquid. Although some dissolution of a gas may occur when using this device, the process is inefficient.

All of the devices described above are directed to some but not all of the scientific principles involving dissolving soluble gases in liquids. For example, one scientific law says that the rate of solution of a gas in a liquid is directly proportional to the area of liquid-gas contact. Thus, the smaller the gas or liquid bubbles are that are in contact with the other medium, the faster the gas will dissolve. This principal was followed in the Butler patent, the Guthrie patent, the Kaelin patent, the Auler patent, and the Greenwalt patent.

The second scientific principal is that a gas, being about 700–800 times less dense or of less mass than a liquid, requires much less energy to pump and to break into fine bubbles than does a liquid. For this reason, it is much cheaper and more efficient to pump and subdivide a gas than a liquid. In addition, a gas or liquid in the same medium has no weight and requires no energy to move it, with the exception of a small amount of friction that must be overcome. A gallon of water, in water, weighs nothing but raising a gallon of water above the surface of the water requires the lifting of 8.3 pounds (3.8 kg) and requires the expenditure of significant energy, depending on how high the water is lifted. Lifting the same volume of gas in the same manner would require many times less energy. Thus, the choice is to move gas rather than liquid and to not move it out of its own medium, if possible. Clearly, the Kaelin and Butler patents violate this principal.

The third principal is that the gas-to-liquid contact must be accomplished with the minimum expenditure of energy for the amount of gas dissolved. This means devising a mechanism that is simple, as symmetrical as possible with no sharp corners, flanges, paddles, etc. to produce excessive drag and with the smoothest surfaces that require a minimum of energy to overcome friction. This is clearly violated by the Kaelin, Auler, and Greenwalt patents.

Finally, the mechanism should be of the simplest design so that it might be most easily constructed from cheap and readily available materials and at the lowest possible cost. Only the Butler patent meets this criterion.

Therefore, it is a feature of the present invention to provide an improved apparatus and method for inexpensively and efficiently dissolving a gas in a liquid.

It is another feature of the present invention to provide an improved process for oxygenating horticulture ponds to enhance the productions of the ponds.

It is yet another feature of the present invention to provide an improved mechanism for oxygenating sewage water.

It is another feature of the present invention to provide an improved process for removing impurities from liquid.

SUMMARY

These and other features and advantages are accomplished by an apparatus including a hollow body having a closed top and a bottom opening with the closed top being larger than the bottom opening. A plurality of side openings are located around the circumference of the hollow body and preferably nearer to the closed top rather than the bottom opening. In one embodiment, the hollow body is rotated at sufficient speed, close enough to the surface, to create a pumping action to draw water up through the bottom opening and out through the plurality of openings causing cavitation. When the hollow body is rotated a depth below the surface where little to no cavitation occurs, a gas is pumped from an external source either into the bottom of the device or into the stream of water exiting the plurality of openings.

Preferably, the total surface area of the plurality of openings is greater than 20% of the surface area of the bottom opening and the hollow body is a frustum. The hollow frustum is either conical or pyramidal.

This apparatus can be used in the processes of oxygenation of horticultural ponds, waste water treatment, impurity removal from water, and any other application that requires dissolution of a gas in a liquid.

BRIEF DESCRIPTION OF THE DRAWINGS

So that the manner in which the above-cited features, advantages and objects of the invention, as well as others which will become apparent, are obtained and can be understood in detail, a more particular description of the invention being summarized above may be had by reference to the embodiments thereof that are illustrated in the drawings, which drawings form a part of the specification. It is to be noted, however, that the impended drawings illustrate only preferred embodiments of the invention and are, therefore, not to be considered limiting of its scope for the invention may admit to other equally effective embodiments.

In the Drawings.

DESCRIPTION OF THE PREFERRED EMBODIMENTS

Figure 1:
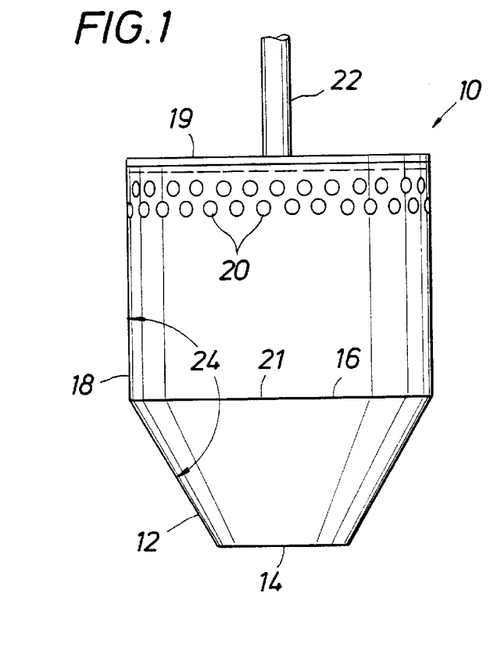
FIG. 1 is an elevational view of a diffuser illustrating one embodiment of the invention.

Now referring to the drawings and first to FIG. 1, a typical embodiment of the present invention is illustrated. Diffuser 10 includes a hollow frustum 12 attached to hollow cylindrical member 18. Frustum 12 includes bottom opening 14 and top opening 16. Cylindrical member 18 is of the same diameter as top opening 16 and has closed top 19 and a bottom opening 21 that aligns with top opening 16, such that when frustum 12 and cylindrical member 18 are attached, one homogeneous unit is created. A plurality of side openings are spaced about the top of the perimeter or circumference of cylindrical member 18. Rotating shaft 22 is positioned in the middle of the closed top 19 of the cylindrical member 18 for rotating diffuser 10 when submerged in a liquid to create a centrifuge-pump.

Figure 1A:
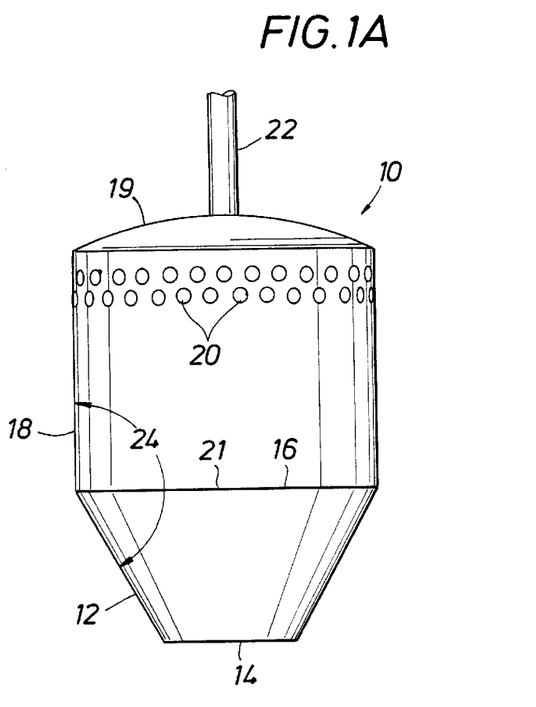
FIG. 1A is an elevational view of a diffuser illustrating a preferred embodiment of the invention.
Figure 1B:
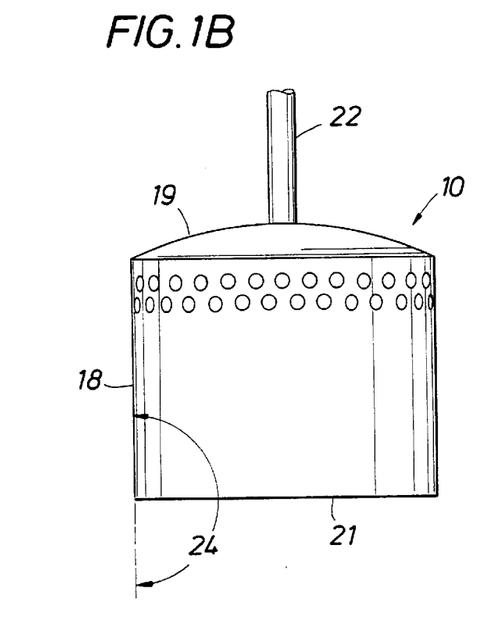
FIG. 1B is an elevational view of a diffuser having only an upper cap portion.
Figure 1C:
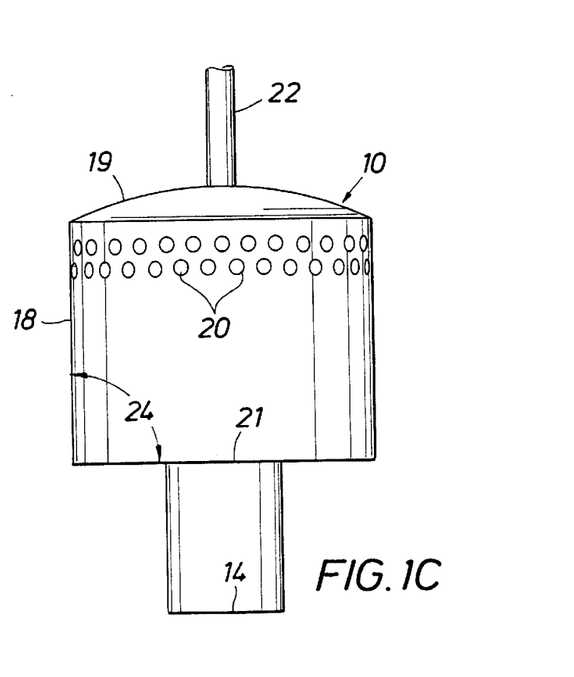
FIG. 1C is an elevational view of a diffuser having a cylindrical lower portion.

In one embodiment of this invention, the diffuser is made from aluminum in accordance with the structure of FIG. 1A. The diameter of cylindrical member 18 and top opening 16 is 2¾ inches. The overall vertical dimension of diffuser 10 is 3$^{15}$⁄$_{32}$ inches, with the vertical dimension of cylindrical member being 2$^{3}$⁄$_{32}$ inches. The diameter of bottom opening 14 is 1 inch, and internal diffuser angle 24 is 147.5°. Frustum 12 is conical in shape, but this is not critical. In other words, the lower portion of the diffuser need not necessarily be a frustum, but can be completely open as shown in FIG. 1B, or can be a cylindrical member of reduced diameter as shown in FIG. 1C. Thus, internal angle 24 may be varied from 90° to 180°, and test data for various diffusers in accordance with the present invention showed no significant change in performance when angle 24 was varied between 90° and 156°. Test data has also shown that the performance of diffuser 10 increases up to 50% when top surface 19 is rounded, as seen in FIGS. 1A–1C, over that of the flat top surface shown in FIG. 1.

Figures 2, 3, 4, 5:
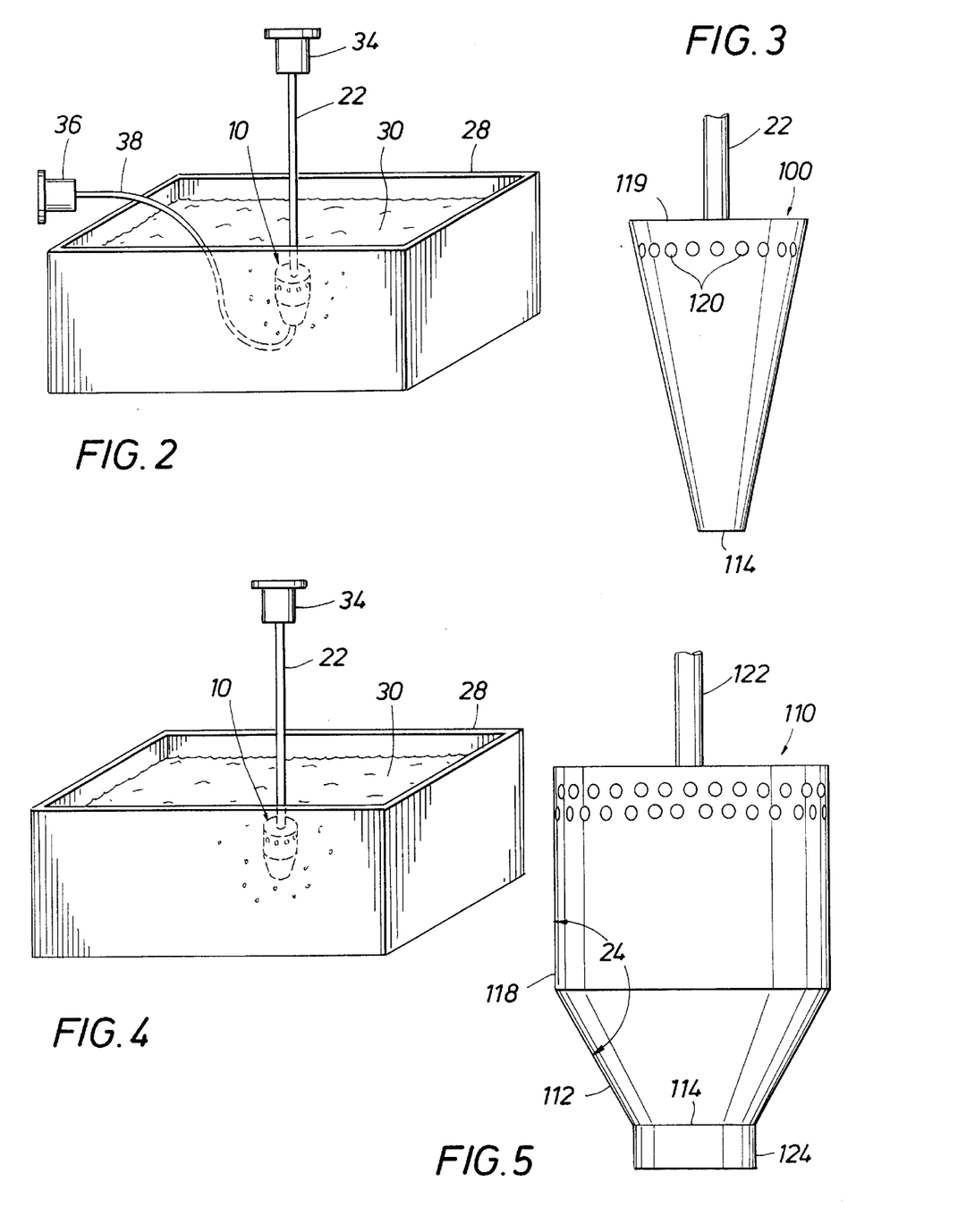
FIG. 2 is a perspective view of a system used to dissolve gases in a liquid in accordance with this invention.
FIG. 3 is an elevational view of a diffuser illustrating an alternate embodiment of the invention.
FIG. 4 is a perspective view of a system used to dissolve gases in a liquid in accordance with an alternate embodiment of this invention.
FIG. 5 is an elevational view of a diffuser illustrating yet another embodiment of the invention.

FIG. 4 shows a diffuser, such as the one shown in FIGS. 1 or 1A, submerged in reservoir 28 containing liquid 30. Diffuser 10 is suspended by rotating shaft 22 of motor 34. Motor 34 spins rotating shaft 22, and thus diffuser 10 at high velocities, at which point the diffuser becomes a centrifuge-pump, wherein liquid is drawn up through bottom opening 14, thrown in an upward direction and out through plurality of openings 20.

Alternatively FIG. 2 shows pump 36 injecting a stream of gas through tubing 38 into bottom opening 14, forming a liquid-gas-mixture that is drawn into the diffuser 10 and ejected through plurality of openings 20. The injections of the gas into diffuser 10 is typically only required when diffuser 10 is submerged substantially below the surface of liquid 30.

When oxygenating a liquid, no separate gas injection is required if diffuser 10 is submerged in liquid a relatively small distance below the surface, such as that shown in FIG. 4. Preliminary results have shown that the rate of oxygen dissolution into the liquid is much higher when diffuser 10 is located near the surface of the water without the injection of the gas, as opposed to the diffuser being located further below the surface of the liquid with the injection of the gas.

When a diffuser of the dimensions described above is placed within three inches of the surface of the liquid (measured from the middle of the top row of side openings) in a 40 gallon reservoir containing approximately 35 gallons of water and rotated at approximately 3,450 revolutions per minute (rpm), a violent surface action is created generating significant cavitation and a concentrated water-air-mixture. The diffuser operating under these conditions produces a greater rate of gas dissolution than when the diffuser is placed within 12 inches of the surface (measured from the middle of the top row of side openings) with air being introduced into the bottom opening at rates from 200–2000 milliliters per minute, or just above or just below the high velocity water jets coming from the plurality of side openings at a rate of 12 liters per minute.

The lower rates produce high percentage oxygen solution (up to 80% at 12 inches depth), while the higher rates produce poorer percentage oxygen solution, but achieve a greater total rate of solution. At 12 inches depth with air being introduced in the bottom of the device, the best result shows oxygen dissolving at 8.3% of the best rate at 3 inches depth with over 30% of the oxygen in the air dissolving at an air flow rate of 2000 milliliters per minute. When air is introduced on the outside and very near the high velocity water jets at a rate of 12 liters of air per minute, oxygen dissolves at approximately 25% of the best rate at 3 in. depth with over 14% of the added oxygen dissolved.

The excellent 3 inch results indicate that this device is ideal for use in shallow ponds, and the results of the 12 inch tests suggest most desirable alternate ways to dissolve a slightly-soluble gas in a deep pool. The oxygen solution results from depths greater than 1 foot will exceed the 3 inch results as the air is introduced at greater depths, causing much longer residence times of the microscopic bubbles in the water. Thus, this device is easily adaptable to virtually all conceivable conditions involving the dissolving of oxygen and other gases in water and other liquids. The energy required to accomplish the above results is 1000–1400 watts, and there is no detectable energy change up to considerable depths.

These more efficient but slower solution rates are ideal for dissolving gases like ozone, where gas concentrations of 1–4% are typical from commercial generators. Large ozone quantities are not required for most purification procedures. For oxygenating a fish pond or sewage plant effluent, the rotation of a diffuser near the surface without introducing additional gases is a more efficient means of oxygenating, primarily, because the energy required to pump the gases is not required. Only the energy necessary to spin the diffuser is required, which is substantially less than that required to pump a gas up through the diffuser.

FIG. 5 shows another embodiment of the diffuser of this invention. Diffuser 110 is constructed of PVC plastic water pipe fittings, including two inch top cap 118 and two inch-to-one inch reducing adapter 112 glued together with PVC cement. The diameter of cylindrical member 118 is 2$^{13}/_{32}$ inches (i.e., larger than 2 inches). In like manner, the upper inside diameter of the reducing adapter is slightly larger than two inches. The overall vertical dimension of diffuser 110 is 4$^{11}/_{32}$ inches, with the vertical dimension of cylindrical member 118 being 1$^{21}/_{32}$ inches. The diameter of bottom opening 14 is 1$^{10}/_{32}$ inches, and internal diffuser angle 124 is 144°. This diffuser also includes vertical extension 124 on bottom opening 114 of 1½ inches outer diameter.

Figure 6:
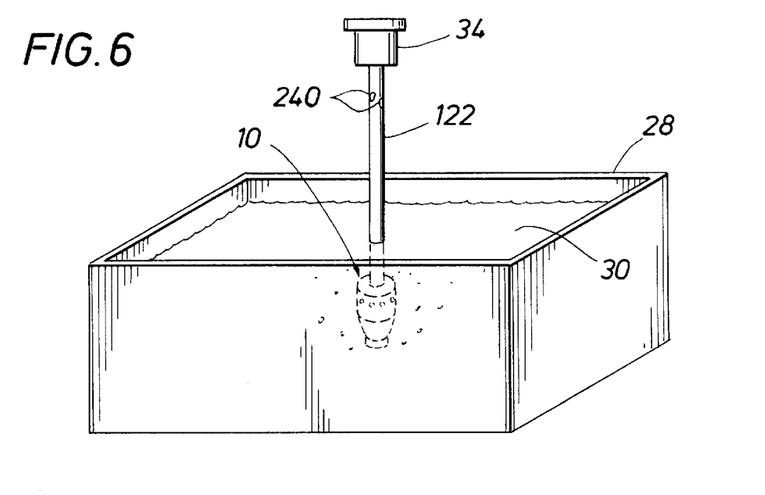
FIG. 6 is a perspective view of a system used to dissolve gases in a liquid in accordance with another alternate embodiment of this invention.

FIG. 6 shows the use of diffuser 110 in yet another embodiment of this invention. Diffuser 110 is connected to hollow shaft 122, which is constructed of one inch PVC hollow water pipe and is approximately 16.5 inches in length, with PVC cement. A metal fitting is attached to the top of hollow shaft 122 to allow for connection to motor 34. Four $^{3}/_{16}$ inch holes are drilled two inches below the top of hollow shaft 122 as air holes. Forty $^{3}/_{8}$ inch holes are drilled into the top cap of diffuser 110.

Tests have shown that submerging diffuser 110 into reservoir 28 to a depth of 12$^{3}/_{8}$ inches (measured from the middle of the top row of side openings) below the surface of the water and turning the diffuser at approximately 3500 rpm pulls air down into the hollow shaft and expels it at high velocities into diffuser 110, producing violent gas-water mixing. When diffuser 110 is rotated at high speed, it acts like a centrifuge-pump and pumps water through the side holes creating a vacuum inside the diffuser that pulls air down through the hollow shaft. The air-water mixture inside the spinning diffuser is thrown out through the side holes. Thus, this embodiment of the invention pumps its own air into the diffuser without requiring an external air or gas source.

Tests have also shown that relatively large internal volumes are required for good results using this embodiment of the invention, primarily because the water in the hollow shaft must be displaced by air before the air can mix with the water inside the diffuser. The greater the height of water in the hollow shaft, the greater the vacuum must be to displace the water. For example, for the shaft length described above, a diffuser of approximate volume of 182 ml with twenty $^{5}/_{16}$ inch holes in the top cap is not capable of pumping air down the shaft. A larger volume inside the diffuser appears to produce a greater vacuum for displacing the water in the diffuser in the shaft. It also appears that if the total number and/or size of holes on the parallel portion of the diffuser is decreased, the solution efficiency is reduced.

Tests run in the 40 gallon reservoir mentioned above show that when a diffuser attached to a hollow shaft, through which air is pumped inside the diffuser by a vacuum created therein by the spinning diffuser, is rotated at 12 inches below the surface it performs at about one-half the efficiency of the rotating diffuser located at 3 inches below the surface. However, test data also suggests that the deeper-submerged diffuser will equal and even exceed the efficiency of the diffuser at the 3 inch depth, when run at depths greater than one foot.

Although this embodiment shows the use of diffuser 110, any similar diffuser, such as that shown in FIGS. 1 or 1A, can be used. Likewise the diffuser 110 can be used with the solid shaft in the same manner that diffuser 10 can be used.

Many tests have confirmed that the high efficiency gas dissolution is effected by the generation of micro-bubbles. This can be accomplished not only by passing the gas through the rapidly spinning diffuser, but also by blasting the large gas bubbles created near the diffuser into micro-bubbles with the high velocity liquid jets that are discharged from the spinning side openings on the outside of the diffuser.

Figure 7:
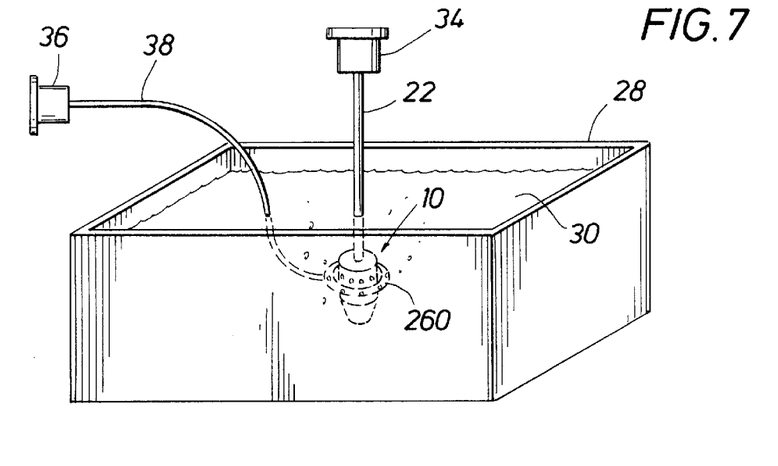
FIG. 7 is a perspective view of a system used to dissolve gases in a liquid in accordance with still another alternate embodiment of this invention.

Therefore, in another embodiment of this invention (shown in FIG. 7), pump 36 injects a stream of gas through tubing 38 into gas ring 260 which is positioned to inject the gas into the fluid jets emerging from the plurality of openings 20 on diffuser 10. Preliminary tests have shown that placing gas ring 260 either just above or just below the greatest diameter of diffuser 10, of the dimensions given above, when it is located at approximately 12 inches from the surface of the liquid and injecting air at about 12 liters per minute produces results that are 25% as good as the best results obtainable with the same diffuser at three inches below the surface without air injection.

The deeper the air or gas bubbles are micronized, the more efficiently the oxygen will dissolve before the bubbles reach the surface. Therefore, the diffuser/air ring combination of FIG. 7 or the diffuser/tube combination of FIG. 2 could be lowered to reasonable depth where the resulting solution rate would be the same or better than the results obtainable near the surface without air or gas injection from an external source.

The injection of the gas into diffuser 10 is typically only required when diffuser 10 is submerged substantially below the surface of liquid 30. Tests have shown that gas injected near the diffuser when it is being rotated just below the surface does not significantly increase the amount of gas being dissolved.

Variations of the parameters of the embodiments described above produce very similar results without departing from the heart of the invention. For example, FIG. 3 shows an alternate embodiment of the diffuser in the form of a single hollow frustum 100 with bottom opening 114 and closed top 119 to which rotating shaft 22 is attached. Plurality of openings 120 are positioned near the top of frustum 100. Thus, cylindrical member 18 of FIG. 1 is not necessary.

A smooth diffuser wall, while highly desirable to reduce friction and prevent an undesirable and wasteful increase in energy consumption, is not critical. For example, the frustum portion of the diffuser, if so equipped, can be pyramidal. Also, it is not critical that the diffuser be hollow. For example, deflecting flanges may be included, but they reduce the efficiency of the diffuser.

Other parameters, such as the size, shape, number, and location of openings do not appear to be critical. The test data produced with this diffuser does reflect certain trends, but these trends are difficult to attribute to individual variables. In fact, the inventor's experiences lead him to conclude that several parameters influence the results, and as such are difficult to quantify.

However, two dimensional relationships have proved to be significant and it is believed that these relationships are readily identifiable factors that distinguish the present invention from those disclosed by the related art, such as the devices described by the Butler and Guthrie patents.

First, it has been observed that the best results for average rates of solution are obtainable when the total area of the side openings in the device exceeds twenty percent of the area of the device's bottom opening, although this is not required to produce results that are superior to currently available commercial devices. A good operable range for the area ratios appears to be 20 to 450 percent, whether diffuser 10 is equipped as shown in FIG. 1, 1A, 1B, 1C, or otherwise. However, the most favorable results are obtainable when the ratio of areas lies in the range of 100 to 400 percent. For example, a diffuser having the above-described dimensions in accordance with the structure of FIG. 1A, and incorporating an area ratio of 375 percent, consistently produces solution rates of 47.3 ml $O_2$/min/gal $H_2O$, or higher, when run at the three inch submerged depth.

Favorable results are also obtainable with the structure represented by FIG. 1B, that is, a cap-only diffuser having no lower body member but maintaining the two dimensional relationships described herein. Thus, a cap-only diffuser 10 having an outer diameter of 2.8 inches with 24 peripheral holes of 0.5 inch diameter rotated at a depth of 3 inches increased the dissolved oxygen in the test tank from 0.61 to 6.72 ppm in 21 seconds, producing an average rate of solution of 46.2 ml $O_2$/min/gal $H_2O$ while consuming 1.37 kw. It is further believed that the use of an increased number of smaller holes, e.g., 48—0.375 inch holes, would produce even better performance for cap-only diffuser 10.

By contrast, test results obtained from a model of the Guthrie device under the same conditions produce a very poor solution rate of 2.62 ml $O_2$/min/gal $H_2O$ when the total area of the side openings are a small percentage, only 18.4 percent, of the bottom opening area.

The second principle that has been observed by the inventor is the preference that the area of any single side opening not exceed twenty percent of the area of the bottom. Test data obtained for a model of the cone described in the Butler patent is poor in comparison to the data for a diffuser in accordance with the present invention. The inventor's Butler model exhibits side openings each having an area of 21 percent of the bottom opening area, which is actually quite conservative given that the side opening areas illustrated in the Butler patent appear to be nearly 100 percent of the bottom opening area. Nevertheless, the inventor's Butler diffuser produced a solution rate of only 11.5 ml $O_2$/min/gal $H_2O$ at the same three inch submerged depth, which is less than one-fourth of the solution rate producible at this depth with the present invention.

The relatively small side opening areas of the present invention enable the production of high velocity liquid jets through the side openings at relatively low rotational speeds. This may be contrasted, for example, with the Butler device whose large side openings would produce high velocity liquid streams at only extremely high rotational speeds. Such great speeds are clearly not practical as they would require a great deal of energy to achieve, and substantial balancing to control the vibrations that would develop from rotational imbalances.

The test data obtained with the present invention at various operating conditions strongly suggest that these distinct structural limitations are at least partially responsible for achieving the superior results to the Butler and Guthrie devices, as discussed above at the preferred three inch operating depth. Moreover, the test results suggest that such superior and unexpected results are obtainable at virtually any practical operating depth, when compared against the prior art devices under similar conditions.

Since it is the ratio of side opening area to bottom opening area that appears to define influential parameters, the number and size of the holes can vary. Good results have been achieved with both small and large openings, with the number of openings depending on the size. For a diffuser of the dimensions described above, the maximum whole size that will produce good results is in the range from ¼ of an inch to ½ an inch, although it is preferred that the hole sizes be less than 20 percent area of the bottom opening area. The maximum whole size dimension thus varies with the size of the diffuser.

In the preferred embodiment of the invention, round openings were used. However, there is no indication that the opening must be limited to a round shape.

The location of the holes on the vertical dimension of the diffuser is not critical. However, better results are obtained when the openings are concentrated near the closed top. Also the direction that the holes are drilled into the diffuser influences the results, but only slightly.

The selection of diffuser material is not critical. The preferred material is PVC plastic; however, any substantially rigid material can be used, including such as aluminum.

Diffusers made of only tough plastic are good for dissolving relatively unreactive oxygen in water. For dissolving the more reactive gases, such as ozone, the diffuser should be made of certain stainless steel alloys, unreactive plastics, metals and metallic alloys that are resistant to oxidation. The diffuser can also be made of two materials including plastic and aluminum.

The exact rotational speed of the diffuser is not critical. It is, however, a major factor in the efficiency with which the gas is dissolved in the liquid. The higher the turning speed of the diffuser, the higher the rate of dissolution. There is however a practical upper limit, above which additional speed requires disproportional power increases, thus decreasing the overall advantage of using the rotating diffuser. In other words, above this practical upper limit, the increase in solubility rate resulting from the increased rotational speed is not sufficient to offset the necessary increase of energy input. These factors must be balanced along with higher speed motor availability, motor costs, etc. Increasing motor speed to 3450 rpm has shown a desirable increase in efficiency, and commercial grade motors that operate at this speed are readily available in many different power requirements and at reasonable costs. The size of the diffuser is closely related to the motor size required.

A diffuser, such as that shown in FIGS. 1 and 5, rotated at 1000 rpm does not produce as good of results as when rotated at higher speeds. The speed of 3450 rpm was chosen to test the diffuser because good results are obtained, and as stated above, this speed motor is commercially available in many different power requirements. Any type of motor that can rotate the diffuser at the desired speed can be selected and used by one of ordinary skill in the art. Tests have shown that a one horsepower motor using about 1200–1400 watts produces good results with the size diffuser described above.

In order to treat waste water in a sewage plant, one of ordinary skill in the art can easily determine the applicable size of diffuser for a given volume of waste water and a desired efficiency rate. The same is true for determining the size of the diffuser for removing contaminants from a liquid, oxygenating a horticultural pond, and oxygenating treated sewage water.

For a particular application, the size of the diffuser or diffusers employed is of importance. It is believed that using larger diffusers will significantly increase the efficiency of the device, because when the inside diameter is doubled, the speed of the peripheral holes doubles at the same motor speed, causing a much greater pumping of water and water-gas mixture and an increase in the dissolving rate. Doubling the diffuser dimensions increases its volume eight-fold, which is believed to increase the gas-liquid pumping rate five to six times, or more.

Figure 8A:
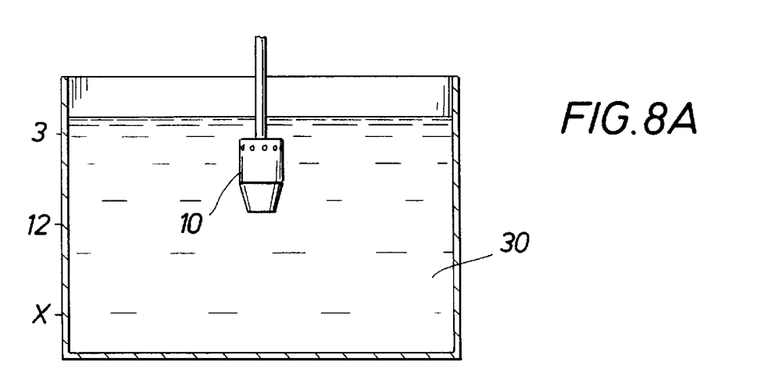
FIGS. 8A–8E are elevational views of different embodiments and methods of using this invention.
Figures 8B, 8C, 8D, 8E:
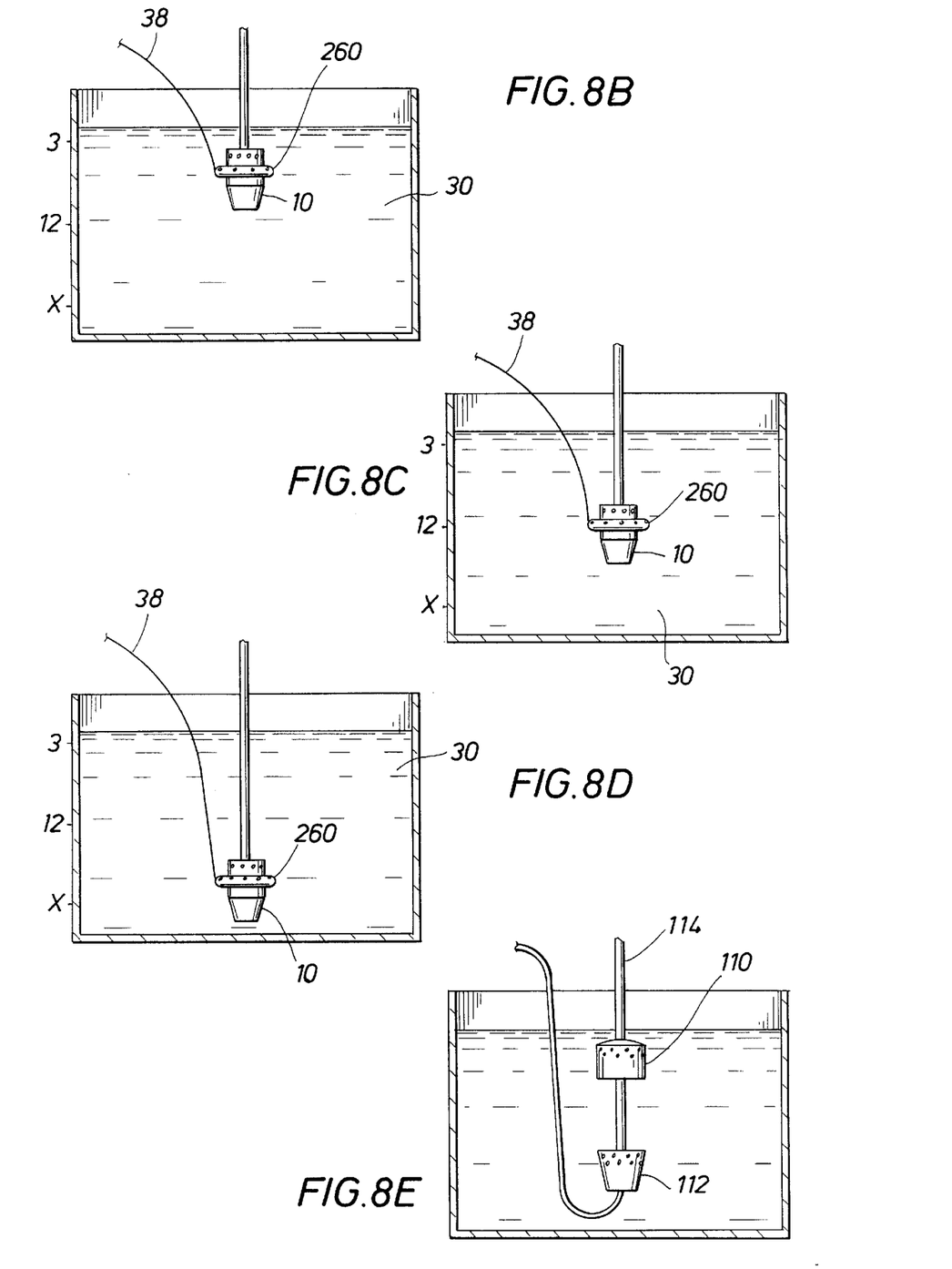

FIGS. 8A–8E are intended to compare and demonstrate the various uses of diffusers made in accordance with this invention. (Only diffuser 10 will be referenced in the following discussion, but the discussion applies to any diffuser made in accordance with this invention.) FIG. 8A shows diffuser 10 located at three inches below the surface wherein no gas injection from an external source is required for the dissolution of the gases above liquid 30. FIG. 8B shows the addition of gas through injector tube 38 and gas ring 260 while diffuser 10 is rotating at three inches below the surface. The configuration shown in FIG. 8B does not provide detectably better results than that shown in FIG. 8A. FIG. 8C shows diffuser 10 located at 12 inches below the surface of liquid 30. A gas is injected by injection tube 38 and gas ring 260. FIG. 8A provides better results than the configuration shown in FIG. 8C at a 12 inch depth. However, it is believed that at a depth substantially below the surface of liquid, a configuration such as that shown in FIG. 8D, with the gas being injected by gas tube 38 and gas ring 260, will produce results that equal or exceed those found in the configuration shown in FIG. 8A. Gas ring 260 could be replaced by a tube extending down below diffuser 10 to inject air inside the diffuser.

FIG. 8E illustrates a particularly distinct embodiment of the present invention wherein the structure shown in FIG. 1A has been essentially disassembled as upper cap 110 and lower cone 112, both of which are mounted on stirring shaft 114. Excellent results have been obtained by placing cap 110 at a shallow depth, e.g., 3 inches while placing cone 112 at a deeper depth, e.g., 10 inches. In one embodiment tested, cap 110 was 2.8 inches in outer diameter and contained 24—½ inch peripheral holes, while cone 112 exhibited a 1.6 inch upper outer diameter with 64—9/32 inch holes about its periphery. For this test, 1000 ml air/min was introduced into the open bottom of cone 112 using a gas tube exposed to a gas supply above the surface of the liquid, and cap 110 pumped its own air. The rapidly spinning diffuser creates a venturi effect that pulls the gas through the tube into the cone. This gas flow may be monitored and controlled by placing a gas flow-meter and a small valve in the tube. In only 12 seconds, the dissolved oxygen in the test tank increased from 0.44 to 5.56 ppm, resulting in 67.8 ml of dissolved oxygen/gal/min. only 1.45 kw of energy was consumed by this test.

Different combinations of caps and cones are likely to produce even superior results. As the lower cone is placed at increasing depths in a body of liquid, the production of gas bubbles at the greater depths will not require any increase in energy, but will cause the bubbles to remain submerged for a greater period of time, thus increasing the overall gas dissolution. Those skilled in the art will appreciate that the cap/cone combination is therefore capable of providing better mixing at all depths in a body of liquid without an increase in energy cost. The test results suggest that such advantages will be extremely beneficial on large scale, commercial operations. Test data for this embodiment further suggest that superior results are available from many variations of the present invention.

Although the illustrated and described embodiments are to actual tested embodiments, operable embodiments of the invention can be made utilizing alternative materials, different fabrication techniques, and different dimensions.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed:

1. An apparatus for dissolving soluble gases above the surface of a liquid into the liquid, comprising:
   a hollow device having a closed top and a bottom opening with the closed top being larger than the bottom opening, and having a plurality of side openings around the perimeter of said device, the side openings having a total cumulative area at least twenty percent as large as the area of the bottom opening; and means connected to said device for rotating said device sufficiently below the surface of the liquid at sufficient speed to create a pumping action to draw the liquid up through said bottom opening and out through the plurality of side openings as a plurality of liquid jets to interact with gases above the surface of the liquid to create cavitation, the side openings being sized so as to define means for increasing the velocity of the liquid jets to enhance the dissolution of the gases into the liquid.

2. The apparatus of claim 1 wherein the side openings have a total cumulative area between 100 and 400 percent of the area of the bottom opening.

3. The apparatus of claim 1, wherein the area of the largest of the side openings does not exceed twenty percent of the area of the bottom opening.

4. The apparatus of claim 1, wherein said hollow device comprises:
  a bottom member having
    an upper edge defining a top opening; and
    a lower edge defining the bottom opening of said device, the top opening being larger than the bottom opening; and
  at least one substantially vertical wall extending upwardly from the top opening of said bottom member to the closed top of said device.

5. The apparatus of claim 3, wherein said bottom member is a hollow frustum.

6. The apparatus of claim 4, wherein said hollow frustum is conical.

7. The apparatus of claim 4, wherein said hollow frustum is pyramidal.

8. The apparatus of claim 1, wherein the plurality of side openings are located nearer to the closed top than the bottom opening.

9. The apparatus of claim 1, wherein said rotating means is a hollow shaft having holes therein and being connected to a motor for rotating the shaft.

10. The apparatus of claim 1, further comprising a gas injector positioned to inject gas through the bottom opening.

11. The apparatus of claim 1, further comprising a gas injector positioned to inject gas into the liquid jets discharged through the plurality of side openings.

12. The apparatus of claim 10, wherein said injected gas is oxygen.

13. The apparatus of claim 10, wherein said injected gas is ozone.

14. An apparatus for dissolving soluble gases in a liquid, comprising:
  a hollow device having a closed top and a bottom opening, and having a plurality of side openings around the perimeter of said device, the side openings having a total cumulative area at least twenty percent as large as the area of the bottom opening with the area of the largest of the side openings not exceeding twenty percent of the area of the bottom opening; and
  a rotating shaft connected to said device to rotate the top of said device below the surface of the liquid at sufficient speed to create a pumping action to draw the liquid up through said bottom opening and out through said plurality of side openings as a plurality of liquid jets to interact with gases above the surface of the liquid, the side openings being sized so as to define means for increasing the velocity of the liquid jets to enhance the dissolution of the gases into the liquid.

15. The apparatus of claim 13, wherein the side openings having a total cumulative area at least as large as the area of the bottom opening.

16. The apparatus in accordance with claim 14, wherein said hollow device includes:
  a lower member having a top opening at a first end thereof and the bottom opening at a second end thereof, the top opening being larger than the bottom opening; and
  an upper member having a bottom opening at a first end thereof, the closed top at a second end thereof, and a vertical wall extending between the first and second ends of said upper member, the first end of said upper member being connected to the first end of said lower member.

17. The apparatus of claim 13, wherein said rotating shaft is a hollow shaft having holes therein and being connected to a motor for rotating the shaft.

18. The apparatus of claim 13, further comprising a gas injector positioned to inject gas through the bottom opening.

19. The apparatus in accordance with claim 13, further comprising a gas injector positioned to inject gas into the liquid expelled out though said plurality of side openings.

20. Apparatus for dissolving soluble gases in a liquid, comprising:
  a hollow device having a closed top, a bottom opening, and a plurality of side openings around the perimeter of said device, the side openings having a total cumulative area at least twenty percent as large as the area of the bottom opening; and
  a rotating shaft connected to said device to rotate the top of said device below the surface of the liquid at sufficient speed to create a pumping action to draw a gas-liquid mixture up through the bottom opening thereof and out through the plurality of side openings thereof as a plurality of gas-liquid jets that interact with gases above the surface of the liquid, the side openings being sized so as to define means for increasing the velocity of the liquid jets to enhance the dissolution of the gases into the liquid.

21. The apparatus of claim 20, further comprising:
  a second hollow device having a closed top, a bottom opening, and a plurality of side openings about its perimeter, said second hollow device being connected to said rotating shaft at a distance from said hollow device, whereby said second hollow device is rotated below said hollow device at sufficient speed to create a pumping action to draw a gas-liquid mixture up through the bottom opening thereof and out through the plurality of side openings thereof as a second plurality of gas-liquid jets that interact with the liquid, the side openings being sized so as to define means for increasing the velocity of the second liquid jets to further enhance the dissolution of the gases into the liquid; and
  means for delivering gas from above the surface of the liquid to interact with said second hollow device.

22. The apparatus in accordance with claim 20, wherein the side openings having a total cumulative area at least as large as the area of the bottom opening.

23. The apparatus of claim 20, wherein the area of the largest of the side openings does not exceed twenty percent of the area of the bottom opening.

24. The apparatus of claim 21, wherein;
  said hollow device is cylindrical in shape; and
  said second hollow device is conical in shape.

25. The apparatus of claim 1 wherein said hollow device is rotated by said rotating means at a depth beneath the surface of 90 to 115 percent of the diameter of the closed top of said device.

* * * * *